(12) United States Patent
Tanaka et al.

(10) Patent No.: US 10,822,106 B2
(45) Date of Patent: Nov. 3, 2020

(54) ELECTRIC POWER GENERATING DEVICE FOR AIRCRAFT

(71) Applicant: KAWASAKI JUKOGYO KABUSHIKI KAISHA, Kobe-shi, Hyogo (JP)

(72) Inventors: Kenichiro Tanaka, Kobe (JP); Hideyuki Imai, Akashi (JP); Isao Fujii, Kakogawa (JP); Tatsuhiko Goi, Kobe (JP); Shogo Fuchiwaki, Akashi (JP)

(73) Assignee: KAWASAKI JUKOGYO KABUSHIKI KAISHA, Hyogo, Kobe-shi (JP)

( * ) Notice: Subject to any disclaimer, the term of this patent is extended or adjusted under 35 U.S.C. 154(b) by 321 days.

(21) Appl. No.: 15/556,886

(22) PCT Filed: Mar. 8, 2016

(86) PCT No.: PCT/JP2016/001257
§ 371 (c)(1),
(2) Date: Sep. 8, 2017

(87) PCT Pub. No.: WO2016/143331
PCT Pub. Date: Sep. 15, 2016

(65) Prior Publication Data
US 2018/0237154 A1    Aug. 23, 2018

(30) Foreign Application Priority Data
Mar. 9, 2015    (JP) .................................. 2015-046330

(51) Int. Cl.
*B64D 41/00*    (2006.01)
*F02C 7/32*    (2006.01)
(Continued)

(52) U.S. Cl.
CPC ............. *B64D 41/00* (2013.01); *F01D 15/10* (2013.01); *F02C 7/32* (2013.01); *F02C 7/36* (2013.01);
(Continued)

(58) Field of Classification Search
CPC ... B64D 41/00; F02C 7/32; F02C 7/36; F01D 15/10; F05D 2220/50; F05D 2220/76;
(Continued)

(56) References Cited

U.S. PATENT DOCUMENTS

2006/0258233  A1*  11/2006  Wilson ..................... B63H 3/00
440/53
2014/0026589  A1*  1/2014  Goi ........................... F02C 7/32
60/784

(Continued)

FOREIGN PATENT DOCUMENTS

WO    2012/137843  A1    10/2012

OTHER PUBLICATIONS

Gear Selection; http://www.brokevw.com/gear_selection.html (Year: 2013).*
(Continued)

*Primary Examiner* — Arun Goyal
*Assistant Examiner* — Colin J Paulauskas
(74) *Attorney, Agent, or Firm* — Sughrue Mion, PLLC

(57) ABSTRACT

An electric power generating device for an aircraft, which is driven by an output of an aircraft engine, comprises an input shaft to which a driving force of the engine is transmitted; a transmission arranged with the input shaft; an electric power generator arranged with the input shaft and the transmission and driven by an output of the transmission; a driving force transmission mechanism disposed on a first end side of the input shaft in an axial direction thereof, the driving force transmission mechanism being configured to
(Continued)

transmit the output from the transmission to the electric power generator; and a casing including a mounting section on the first end side of the input shaft in the axial direction, wherein the transmission includes an input section provided on a second end side of the input shaft in the axial direction, the input section being configured to receive as an input a rotational driving force from the input shaft, and an output section provided on the first end side of the input shaft in the axial direction, the output section being configured to output to the driving force transmission mechanism the rotational driving force whose speed has been changed, and wherein the driving force transmission mechanism has an inner space and the input shaft is inserted into the inner space.

6 Claims, 3 Drawing Sheets

(51) Int. Cl.
| | | |
|---|---|---|
| F16H 1/06 | (2006.01) | |
| F16H 15/38 | (2006.01) | |
| F16H 57/023 | (2012.01) | |
| H02K 7/116 | (2006.01) | |
| F01D 15/10 | (2006.01) | |
| F02C 7/36 | (2006.01) | |
| H02K 7/18 | (2006.01) | |
| F16H 57/02 | (2012.01) | |

(52) U.S. Cl.
CPC ............... *F16H 1/06* (2013.01); *F16H 15/38* (2013.01); *F16H 57/023* (2013.01); *H02K 7/116* (2013.01); *H02K 7/18* (2013.01); *H02K 7/1823* (2013.01); *F05D 2220/50* (2013.01); *F05D 2220/76* (2013.01); *F05D 2250/312* (2013.01); *F05D 2250/36* (2013.01); *F05D 2260/39* (2013.01); *F05D 2260/402* (2013.01); *F16H 2015/386* (2013.01); *F16H 2057/02082* (2013.01); *Y02T 50/671* (2013.01)

(58) Field of Classification Search
CPC .. F05D 2250/36; F05D 2250/312; F16H 1/06; F16H 13/14; F16H 15/28; F16H 15/38; F16H 57/023; F16H 61/661; F16H 2015/383; F16H 2015/386
USPC ........... 310/75 D; 74/412 R–414; 476/40–46
See application file for complete search history.

(56) References Cited

U.S. PATENT DOCUMENTS

| | | | | |
|---|---|---|---|---|
| 2016/0097328 | A1* | 4/2016 | Wintgens | ................ F02C 7/32 415/1 |
| 2018/0062480 | A1* | 3/2018 | Tanaka | ................ B64D 41/00 |
| 2018/0202368 | A1* | 7/2018 | Suciu | .................... F02C 7/275 |

OTHER PUBLICATIONS

International Search Report of PCT/JP2016/001257 dated Jun. 7, 2016.

\* cited by examiner

ELECTRIC POWER GENERATING DEVICE FOR AIRCRAFT

CROSS REFERENCE TO RELATED APPLICATIONS

This application is a National Stage of International Application No. PCT/JP2016/001257 filed Mar. 8, 2016, claiming priority based on Japanese Patent Application No. 2015-046330 filed Mar. 9, 2015, the contents of all of which are incorporated herein by reference in their entirety.

TECHNICAL FIELD

The present invention relates to an electric power generating device for an aircraft.

BACKGROUND ART

As an electric power generating device mounted in an aircraft, an electric power generating device which includes a transmission and is an integrated drive generator (IDG) type is known. In this IDG, generator is rotated at a constant rotational speed to generate electric power with a constant frequency irrespective of an engine speed of an engine for the aircraft. This electric power generating device includes the transmission which changes a speed of a rotational driving force of the engine, the electric power generator which generates the electric power by the rotational driving force whose speed has been changed by the transmission, and a driving force transmission mechanism which transmits to the electric power generator the rotational driving force whose speed has been changed by the transmission. For example, as disclosed in Patent Literature 1, this electric power generating device is mounted on a fan case of the engine for the aircraft.

CITATION LIST

Patent Literature

Patent Literature 1: WO2012/137843A1 Publication

SUMMARY OF INVENTION

Technical Problem

The electric power generating device is mounted in a limited space which is in the vicinity or the peripheral portion of the engine. For this reason, the electric power generating device is required to be as compact as possible. In addition, it is desirable to reduce an overhang moment generated in a state in which the electric power generating device is mounted.

An object of the present invention is to provide an electric power generating device for an aircraft which can realize a compact configuration and a low overhang moment.

Solution to Problem

To solve the above-described problem, according to an aspect of the present invention, an electric power generating device for an aircraft, which is driven by an output of an engine for the aircraft, comprises an input shaft to which a driving force of the engine is transmitted; a transmission arranged with the input shaft; an electric power generator arranged with the input shaft and the transmission and driven by an output of the transmission; a driving force transmission mechanism which is disposed on a first end side of the input shaft in an axial direction thereof, the driving force transmission mechanism being configured to transmit the output from the transmission to the electric power generator; and a casing including a mounting section on the first end side of the input shaft in the axial direction, wherein the transmission includes an input section which is provided on a second end side of the input shaft in the axial direction, the input section being configured to receive as an input a rotational driving force from the input shaft, and an output section which is provided on the first end side of the input shaft in the axial direction, the output section being configured to output to the driving force transmission mechanism the rotational driving force whose speed has been changed, and wherein the driving force transmission mechanism has an inner space and the input shaft is inserted into the inner space.

In accordance with the above-described configuration, the driving force transmission mechanism has the inner space and the input shaft is inserted into this inner space. Since the driving force transmission mechanism and the input shaft are disposed in such a manner that a common space is shared by the driving force transmission mechanism and the input shaft, inside the casing, the inner volume of the casing can be reduced. Since the driving force transmission mechanism is disposed on the first end side of the input shaft in the axial direction, with the mounting section of the casing, the center of gravity of the electric power generating device for the aircraft can be located close to the mounting section. Therefore, an overhang moment in a region of the electric power generating device for the aircraft, the region being in the vicinity of the mounting section, can be reduced.

Advantageous Effects of Invention

In accordance with the present invention, it is possible to provide an electric power generating device for an aircraft, which can realize a compact configuration and a low overhang moment.

DESCRIPTION OF EMBODIMENTS

Hereinafter, the embodiment of the present invention will be described with reference to the drawings.

Embodiment

Engine For Aircraft

Figure 1:
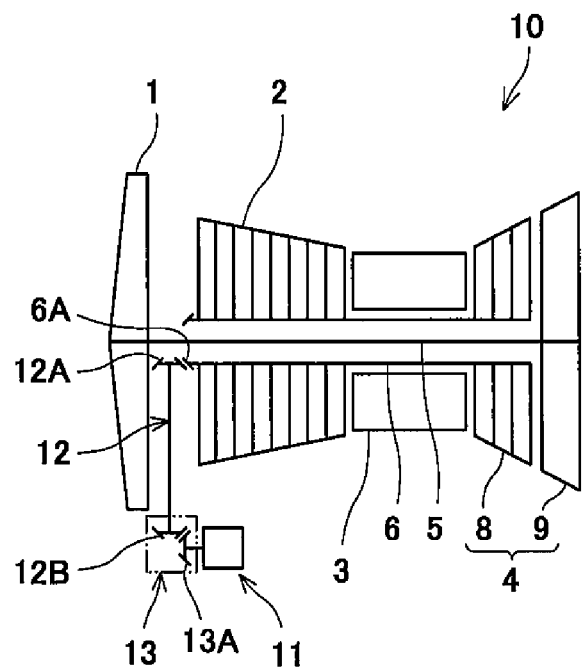
FIG. 1 is a schematic view showing an engine for an aircraft, and an electric power generating device for the aircraft which is mounted on the engine for the aircraft, according to an embodiment, with a gear box interposed between the engine and the electric power generating device.
Figure 2:
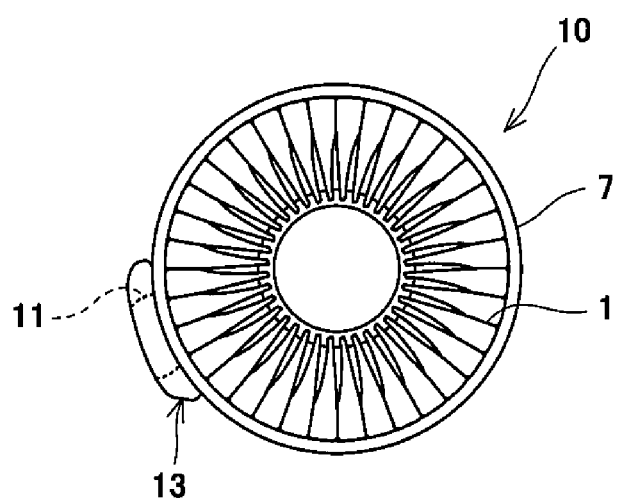
FIG. 2 is a view showing the electric power generating device for the aircraft which is mounted on the engine for the aircraft.

FIG. 1 is a schematic view showing an engine 10 for an aircraft (hereinafter will also be referred to as "engine 10"), and an electric power generating device 11 for the aircraft (hereinafter will also be referred to as "electric power generating device 11") which is mounted on the engine 10, according to an embodiment, with a gear box 13 interposed between the engine 10 and the electric power generating device 11. FIG. 2 is a view showing the electric power generating device 11 mounted on the engine 10. As shown in FIG. 1, the engine 10 is a two-shaft gas turbine engine, and includes a fan 1, a compressor 2, a combustor 3, a turbine 4, a low-pressure shaft 5, and a high-pressure shaft 6. The fan 1 is disposed in the front portion of the engine 10 and covered by a fan case 7. The turbine 4 includes a high-pressure turbine 8 at a previous stage and a low-pressure turbine 9 at a subsequent stage. The low-pressure turbine 9 is coupled to the fan 1 via the low-pressure shaft 5. The high-pressure turbine 8 is coupled to the compressor 2 via the high-pressure shaft 6. The high-pressure shaft 6 is a shaft member having an inner hollow space. The low-pressure shaft 5 is inserted into the hollow space of the high-pressure shaft 6. In the embodiment, the center axis of the low-pressure shaft 5 will be referred to as an engine center axis.

A coupling shaft 12 provided with a bevel gear 12A at a first end thereof and a bevel gear 12B at a second end thereof is placed rearward of the fan 1. The coupling shaft 12 extends in a radial direction of the engine 10, and is rotatably supported on the engine 10. The high-pressure shaft 6 is provided with a bevel gear 6A at an end thereof. The high-pressure shaft 6 and the coupling shaft 12 are coupled to each other via the bevel gears 6A, 12A. The coupling shaft 12 is coupled to the gear box 13 having a bevel gear 13A via the bevel gears 12B, 13A. The gear box 13 is coupled to the electric power generating device 11. As shown in FIG. 2, the electric power generating device 11 is mounted on the engine 10, on an outer peripheral side of the fan case 7. A mounting port of the electric power generating device 11 is mounted on the gear box 13. In this configuration, during the operation of the engine 10, a rotational driving force of the high-pressure shaft 6 is input to the electric power generating device 11 through the coupling shaft 12 and the gear box 13.

Electric Power Generating Device

Figure 3:
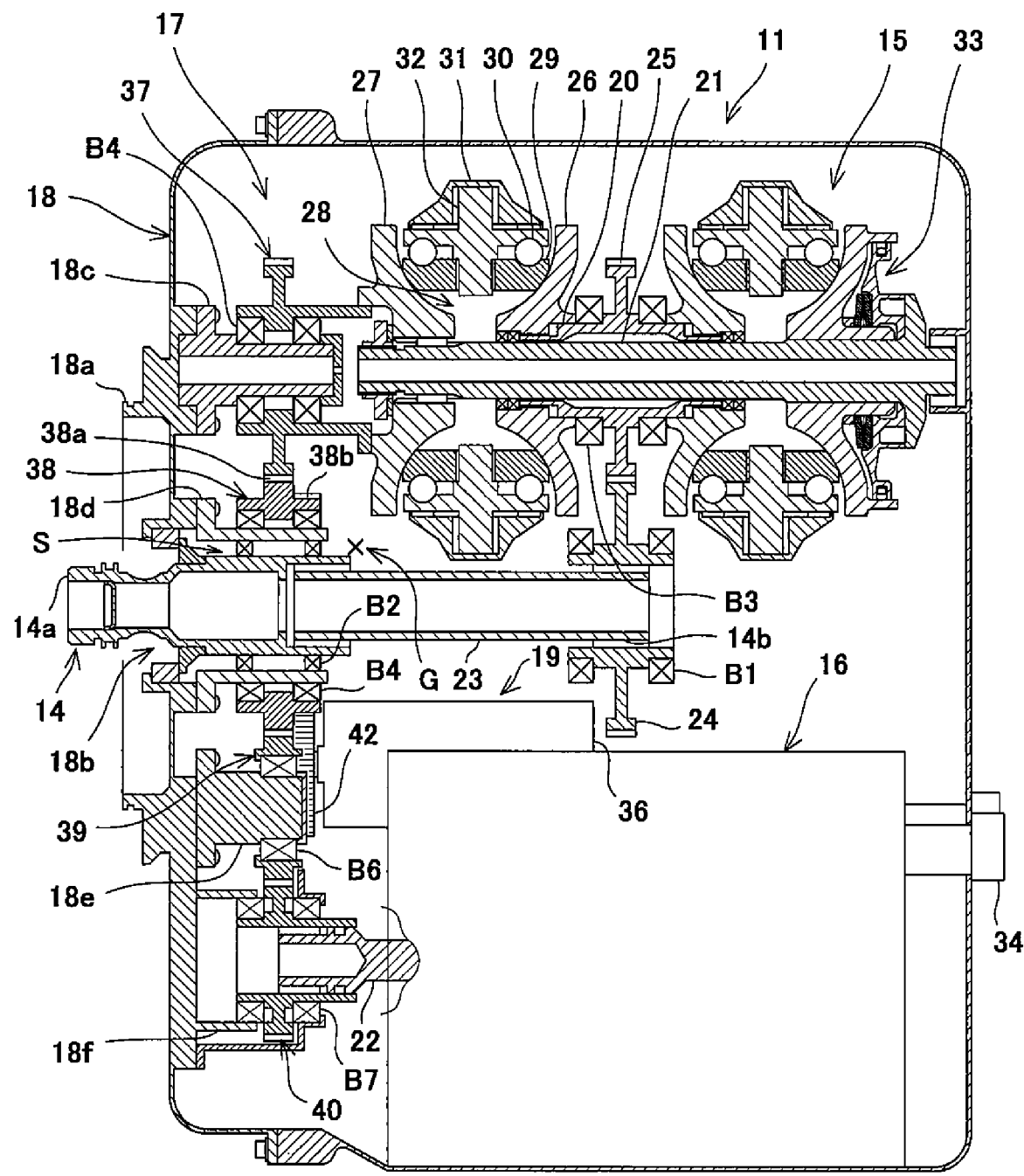
FIG. 3 is a cross-sectional view schematically showing a driving force transmission path of the electric power generating device for the aircraft.
Figure 4:
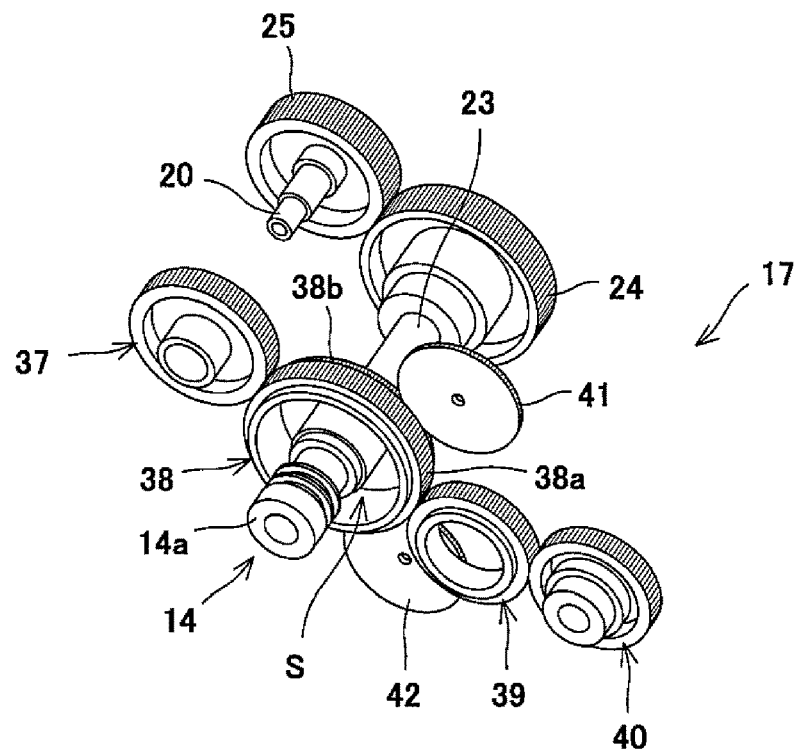
FIG. 4 is a perspective view of a device input shaft, a transmission input gear, and a driving force transmission mechanism of the electric power generating device for the aircraft.
Figure 5:
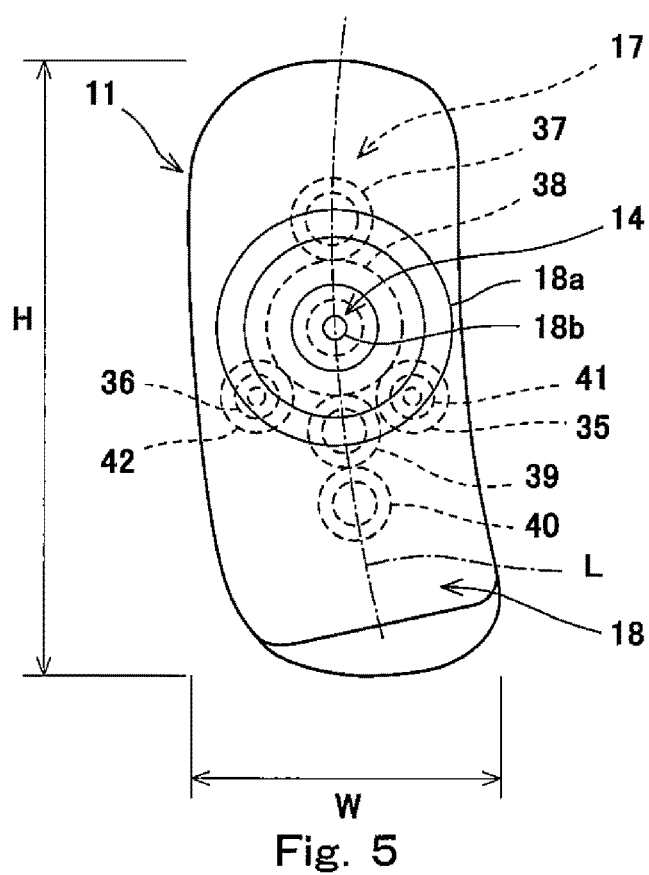
FIG. 5 is a front view of the electric power generating device for the aircraft, which is viewed from an axial direction of the device input shaft.

FIG. 3 is a cross-sectional view schematically showing a driving force transmission path of the electric power generating device 11. FIG. 4 is a perspective view of a device input shaft 14, a transmission input gear 25, and a driving force transmission mechanism 17 of the electric power generating device 11. FIG. 5 is a front view of the electric power generating device 11, which is viewed from an axial direction of the device input shaft 14. In FIG. 5, the driving force transmission mechanism 17, and an oil feeding pump 35 and an oil suction pump 36 of an oil pump unit 19 are indicated by broken lines.

The electric power generating device 11 is an integrated drive generator (IDG). The electric power generating device 11 includes the device input shaft 14 as an input shaft to which the rotational driving force of the engine 10 is transmitted, a transmission 15 arranged with the device input shaft 14, an electric power generator 16 arranged with the device input shaft 14 and the transmission 15 and driven by an output of the transmission 15, the driving force transmission mechanism 17 which is disposed on a first end 14a side of the device input shaft 14 in an axial direction thereof, the driving force transmission mechanism 17 being configured to transmit to the electric power generator 16 the rotational driving force whose speed has been changed by the transmission 15, a casing 18 including a mounting section 18a on the first end 14a side of the device input shaft 14 in the axial direction, and at least one auxiliary unit such as the oil pump unit 19 driven by the output of the transmission 15.

As shown in FIG. 3, the casing 18 accommodates therein the electric power generator 16 and the transmission 15 in a state in which the electric power generator 16 and the transmission 15 are arranged, and the device input shaft 14 is interposed between the electric power generator 16 and the transmission 15. In the interior of the casing 18, the device input shaft 14, a transmission input shaft 20 and a transmission output shaft 21 of the transmission 15, and a generator input shaft 22 of the electric power generator 16 are disposed in parallel with each other. When the electric power generating device 11 is mounted on the engine 10, the device input shaft 14, the transmission 15 and the electric power generator 16 are disposed so that they are arranged in the circumferential direction of the engine 10. The casing 18 has a box shape which is flat and longitudinally elongated. The casing 18 has a relatively small width (W) when viewed from the axial direction of the device input shaft 14 and a relatively large height (H) (see FIG. 5). The mounting section 18a is an annular flange provided at a side portion of the casing 18. The electric power generating device 11 is mounted on the engine 10 at the mounting section 18a by use of a mounting member such as a clamp band. In a region surrounded by the mounting section 18a of the casing 18, an opening 18b connected to the inside space of the casing 18 is formed. Through the opening 18b, the first end 14a of the device input shaft 14 in the axial direction, which is coupled to the gear box 13, is exposed. The electric power generating device 11 is mounted on the engine 10 in such a manner that the device input shaft 14, the transmission input shaft 20 and the transmission output shaft 21, and the generator input shaft 22 are parallel to the low-pressure shaft 5 and the high-pressure shaft 6. As defined herein, the term "parallel" means that the shafts are substantially parallel (e.g., an angle difference between the shafts is 5 degrees or less).

In the interior of the casing 18, the device input shaft 14 is disposed between the transmission 15 and the electric power generator 16. The device input shaft 14 includes a shaft body 23 which is rotatably supported. The device input shaft 14 is provided with an output gear 24 at a location which is in the vicinity of an end portion of the shaft body 23, the end portion being located on the second end 14b side in the axial direction (closer to the second end 14b). The second end 14b is positioned to correspond to the center portion of the transmission 15 and the center portion of the electric power generator 16, in the axial direction of the device input shaft 14. The output gear 24 is constituted by, for example, a spur gear. The output gear 24 is placed in mesh with the transmission input gear 25 of the transmission 15. The device input shaft 14 is rotatably supported on the peripheral portion of the opening 18b of the casing 18 and bearings B1, B2 provided in the casing 18.

Transmission

The transmission 15 includes an input section provided on the second end 14b side of the device input shaft 14 in the axial direction, the input section being configured to receive as an input the rotational driving force from the device input shaft 14, and an output section provided on the first end 14*a* side of the device input shaft 14 in the axial direction, the output section being configured to transmit to the driving force transmission mechanism 17 the rotational driving force whose speed has been changed. More specifically, the transmission 15 is a traction drive continuously variable transmission (CVT), and is a double cavity half toroidal CVT, in the present embodiment. The transmission 15 includes the transmission input shaft 20 which has a hollow space and is rotatably supported on a bearing B3 of the casing 18, the transmission output shaft 21 which is inserted into the hollow space of the transmission input shaft 20 in such a manner that the axial center portion of the transmission output shaft 21 is covered by the transmission input shaft 20, the transmission output shaft 21 being rotatable independently of the transmission input shaft 20, the transmission input gear 25 which is provided on the transmission input shaft 20, the transmission input gear 25 being configured to function as the above-described input section, a pair of input discs 26 provided on both sides, respectively, of the transmission input gear 25, and a pair of output discs 27 provided on the transmission output shaft 21 to face the input discs 26, respectively. The transmission input gear 25 and the pair of input discs 26 are rotatable together with the transmission input shaft 20 around a specified transmission center axis. The pair of output discs 27 are rotatable together with the transmission output shaft 21 around the transmission center axis. The center axis of the transmission input shaft 20 and the center axis of the transmission output shaft 21 conform to the transmission center axis. Each of a plurality of cavities 28 is formed between the input disc 26 and the output disc 27 facing each other. The plurality of cavities 28 are formed around the axis of the transmission output shaft 21. The plurality of cavities 28 form a pair in the axial direction of the transmission output shaft 21. In the transmission 15, one of the pair of output discs 27 which is closer to the mounting section 18*a* functions as the above-described output section.

The transmission 15 includes power rollers 29 which are rotary members provided inside each of the cavities 28. Each of the power rollers 29 is supported by a bearing 30 and a trunnion 31 in such a manner that the power roller 29 is rotatable around the axis of a roller shaft 32 and is tiltable around a tilt motion axis which is skew with respect to an axis extending through the transmission center axis. A pressing mechanism 33 is provided in the vicinity of one of the pair of output discs 27. The pressing mechanism 33 causes the input disc 26 and the output disc 27 to press the power roller 29 with a predetermined pressure. The pressing mechanism 33 is, for example, a cam type pressing mechanism or a hydraulic (hydraulically driven) pressing mechanism. A lubricating oil film (membrane) with a high viscosity is formed on a contact region of the power roller 29 which contacts each of the input disc 26 and the output disc 27. During the operation of the transmission 15, the rotational driving force of the input disc 26 is transmitted to the output disc 27 via the power roller 29 by a fluid friction of this lubricating oil film with the high viscosity. A transmission ratio (transmission gear ratio) is adjusted by adjusting the tilt angle of the power roller 29 by use of a control mechanism (not shown). Specifically, the transmission ratio is adjusted by controlling a position at which the power roller 29 contacts each of the input disc 26 and the output disc 27.

Electric Power Generator

Inside the casing 18, the electric power generator 16 is arranged with the device input shaft 14 and the transmission 15. For example, the electric power generator 16 includes the generator input shaft 22 disposed on the first end 14*a* side of the device input shaft 14, an auxiliary electric power generating section (not shown) coupled to the generator input shaft 22, a main electric power generating section, and a rotation rectifier. In the present embodiment, inside the casing 18, the electric power generator 16 is disposed to correspond to the plurality of cavities 28 of the transmission 15 in the axial direction of the device input shaft 14, with the device input shaft 14 interposed between the plurality of cavities 28 and the electric power generator 16. Inside the casing 18, the electric power generator 16 and the transmission 15 are disposed to be distant from the opening 18*b* of the casing 18. The generator input shaft 22 serves to input the driving force to the electric power generator 16. Hereinafter, the center axis of the generator input shaft 22 will be referred to as a generator center axis. The structure of the electric power generator 16 is not limited to a structure which is line-symmetric with respect to the generator center axis.

When the rotational driving force is input to the generator input shaft 22, the auxiliary electric power generating section performs primary electric power generation. The rotation rectifier rectifies the electric power generated in the primary electric power generation, and supplies the electric power to the main electric power generating section. The main electric power generating section performs secondary electric power generation. The electric power generated in the secondary electric power generation is output as the electric power generated in the electric power generator 16. The electric power generated in the electric power generator 16 is taken out through a terminal 34 exposed outside the casing 18 from the second end 14*b* side of the device input shaft 14 in the axial direction.

Auxiliary Unit

The oil pump unit 19 which is the auxiliary unit includes the oil feeding pump 35 which feeds the lubricating oil to the transmission 15, the driving force transmission mechanism 17, or the like, and the oil suction pump 36 which suctions up the oil reserved in the casing 18. The oil feeding pump 35 and the oil suction pump 36 are driven by the output of the transmission 15 transmitted via the driving force transmission mechanism 17 to the oil feeding pump 35 and the oil suction pump 36. The oil feeding pump 35 and the oil suction pump 36 have a substantially equal size and substantially the same shape. The oil feeding pump 35 and the oil suction pump 36 are disposed to sandwich the electric power generator 16 in the width direction of the casing 18 when viewed from the axial direction of the device input shaft 14.

Driving Force Transmission Mechanism

The driving force transmission mechanism 17 transmits the output of the transmission 15 to the electric power generator 16, the oil pump unit 19, or the like. Specifically, as shown in FIGS. 3, 4, and 5, the driving force transmission mechanism 17 is a gear mechanism. The driving force transmission mechanism 17 includes a first gear 37 provided on the transmission output shaft 21 of the transmission 15, a second gear 38 placed in mesh with the first gear 37, a third gear 39 placed in mesh with the second gear 38, a fourth gear 40 provided on the generator input shaft 22 of the electric power generator 16, the fourth gear 40 being placed in mesh with the third gear 39, a fifth gear 41 placed in mesh with the second gear 38, and a sixth gear 42 placed in mesh with the second gear 38. Inside the casing 18, the driving force transmission mechanism 17 is disposed on the first end 14*a* side of the device input shaft 14 in the axial direction. The driving force transmission mechanism 17 is disposed in the vicinity of the mounting section 18*a*. In this example, the driving force transmission mechanism 17 is disposed between the transmission 15 and the mounting section 18*a*, and between the electric power generator 16 and the mounting section 18*a*, in the axial direction of the engine center axis. In other words, the driving force transmission mechanism 17 is closer to the mounting section 18*a* than the transmission 15 and the electric power generator 16, in the axial direction of the engine center axis.

The first gear 37 is a hollow gear. The first gear 37 is coupled to the output section of the transmission 15, at a location which is on the first end 14*a* side of the device input shaft 14 in the axial direction, of the transmission 15. With this configuration, the rotational driving force whose speed has been changed by the transmission 15 is transmitted to the first gear 37. The first gear 37 is rotatably supported on a support section 18*c* provided in the casing 18 by a bearing B4.

The second gear 38 is an annular hollow gear having a through-hole S. The second gear 38 is used as a first idler gear of the driving force transmission mechanism 17. The second gear 38 is disposed between the transmission 15 and the electric power generator 16 in the circumferential direction of the engine center axis. More specifically, the center axis of the second gear 38 is located between the transmission center axis and the generator center axis in the circumferential direction of the engine center axis. The driving force transmission mechanism 17 has an inner space into which the device input shaft 14 is inserted. Specifically, this inner space is the through-hole S of the second gear 38. In the electric power generating device 11, the device input shaft 14 is inserted into the through-hole S. In this way, the driving force transmission mechanism 17 and the device input shaft 14 are disposed in such a manner that a common space is shared by the driving force transmission mechanism 17 and the device input shaft 14, inside the casing 18. In this layout, the internal volume of the casing 18 is reduced, and the electric power generating device 11 has a compact configuration. The second gear 38 includes a main gear portion 38*a* and a sub-gear portion 38*b* which are arranged in the rotational axis direction of the second gear 38. The main gear portion 38*a* is located on the first end 14*a* side of the device input shaft 14 in the axial direction. The main gear portion 38*a* is in mesh with the first gear 37 and the third gear 39. The sub-gear portion 38*b* is located on the second end 14*b* side of the device input shaft 14 in the axial direction. The sub-gear portion 38*b* is in mesh with the fifth gear 41 for transmitting the output of the transmission 15 to the oil feeding pump 35 and the sixth gear 42 for transmitting the output of the transmission 15 to the oil suction pump 36. The second gear 38 is rotatably supported on a stationary member 18*d* provided in the casing 18 by a bearing B5.

The third gear 39 is a hollow gear. The third gear 39 is used as a second idler gear in the driving force transmission mechanism 17. The third gear 39 is placed in mesh with the second gear 38 and the fourth gear 40. By using the third gear 39, the size of the second gear 38 and the size of the fourth gear 40 are not increased while maintaining the layout of the device input shaft 14 and the electric power generator 16 inside the casing 18, compared to a case where the second gear 38 and the fourth gear 40 are directly in mesh with each other. This allows the electric power generating device 11 to have a compact configuration. The third gear 39 is rotatably supported on a support section 18*e* provided in the casing 18 by a bearing B6.

The fourth gear 40 is a hollow gear. The fourth gear 40 is placed in mesh with the third gear 39. The fourth gear 40 is fastened to the generator input shaft 22 of the electric power generator 16, at a location which is on the first end 14*a* side of the device input shaft 14 in the axial direction. The fourth gear 40 is rotatably supported on a support section 18*f* provided in the casing 18 by a bearing B7.

In accordance with the electric power generating device 11 having the above-described configuration, when the rotational driving force of the engine 10 is transmitted to the device input shaft 14, the rotational driving force of the device input shaft 14 is transmitted to the transmission input gear 25 of the transmission 15 via the output gear 24, and its speed is changed while the rotational driving force is transmitted from the input disc 26 to the output disc 27 via the power roller 29. In this way, the rotational driving force whose speed has been changed is output to the first gear 37 of the driving force transmission mechanism 17 via the output disc 27. The output of the transmission 15 is transmitted to the generator input shaft 22 through the first gear 37, the second gear 38, the third gear 39 and the fourth gear 40, in this order. The electric power is generated in the electric power generator 16 by the output of the transmission 15. The electric power output from the electric power generator 16 is supplied to an external device through the terminal 34. The rotational driving force transmitted to the second gear 38 is applied to the oil feeding pump 35 via the fifth gear 41 to drive the oil feeding pump 35. The rotational driving force is also applied to the oil suction pump 36 via the sixth gear 42 to drive the oil suction pump 36. The transmission ratio set in the transmission 15 is adjusted according to the rotational speed of the device input shaft 14. The output of the transmission 15 is input as the rotational driving force with a constant rotational speed to the generator input shaft 22 via the driving force transmission mechanism 17. In this way, the electric power generator 16 generates alternating current (AC) power with a constant frequency. The AC power is supplied to an external device via the terminal 34.

As shown in FIG. 5, in the electric power generating device 11, the plurality of gears (the first gear 37, the second gear 38, the third gear 39, and the fourth gear 40) of the driving force transmission mechanism 17 are arranged on a virtual line L with an arched shape or at a location which is in the vicinity of the virtual line L. In this layout, the plurality of gears are arranged in the arched shape along the circumferential direction of the outer peripheral portion with a circular-arc shape of the engine 10. Therefore, the casing 18 can be thinned along the outer peripheral portion of the engine 10.

As shown in FIG. 3, in the electric power generating device 11, the driving force transmission mechanism 17, a coupling portion at which the driving force transmission mechanism 17 and the electric power generator 16 are coupled to each other, and a coupling portion at which the driving force transmission mechanism 17 and the transmission 15 are coupled to each other, are disposed in the vicinity of the mounting section 18*a* of the casing 18. In this layout, the center of gravity G of the electric power generating device 11 can be located in the vicinity of the mounting section 18a. Therefore, in a state in which the electric power generating device 11 is mounted on the engine 10, a pivot motion (overhang moment) of the electric power generating device 11 around a region which is in the vicinity of the mounting section 18a can be reduced. As a result, the electric power generating device 11 can be mounted on the engine 10 with a stable posture. Thus, in accordance with the present embodiment, it becomes possible to provide the electric power generating device 11 which can realize a compact configuration and a low overhang moment.

As measures to address the overhang moment, for example, the thickness of the mounting section and a region which is in the vicinity of the mounting section may be increased to increase strength. However, this may increase a weight. In contrast, in the electric power generating device 11 of the present embodiment, the overhang moment is reduced in the above-described manner. Therefore, for example, the mounting section 18a of the casing 18 and the region which is in the vicinity of the mounting section 18a can be thinned and the weight can be reduced.

In the electric power generating device 11, since the generator input shaft 22 of the electric power generator 16 is disposed on the mounting section 18a side of the casing 18 (at a location which is closer to the mounting section 18a of the casing 18), with the driving force transmission mechanism 17. Thus, the terminal 34 of the electric power generator 16 is disposed on the side surface of the casing 18 which is opposite to the side surface on which the mounting section 18a of the casing 18 is disposed. Therefore, in a state in which the electric power generating device 11 is mounted on the engine 10 at the mounting section 18a, wires can be easily attached to and detached from the terminal 34. This improves convenience.

Others

The present invention is not limited to the above-described embodiment, and the configuration thereof can be changed, added or deleted within a scope of the invention. Although in the above-described embodiment, the double cavity half toroidal CVT is exemplarily described as the transmission, the transmission is not limited to this type. The type of the transmission is not limited to the double cavity type, and may be a single cavity type. The transmission is not limited to the traction drive CVT. As a drive method for the transmission, for example, a belt drive method or another drive method may be used.

The third gear 39 of the driving force transmission mechanism 17 is not essential. For example, the third gear 39 may be omitted, and the rotational driving force of the first gear 37 may be transmitted to the fourth gear 40 via the second gear 38.

In the driving force transmission mechanism 17, at least either the first gear 37 and the second gear 38, or the third gear 39 and the fourth gear 40 may be in mesh with each other with another gear interposed therebetween.

All of the gears of the driving force transmission mechanism 17 are not necessarily hollow gears. It is sufficient that at least one of the gears is a hollow gear. The gears other than the gear into which the device input shaft 14 is inserted may be solid gears.

The driving force transmission mechanism is not limited to the gear mechanism. For example, the driving force transmission mechanism may include a belt mechanism including an endless belt provided around the output section side of the transmission 15 and the generator input shaft 22 side of the electric power generator 16, at a location which is on the first end 14a side of the device input shaft 14 in the axial direction. In this case, the device input shaft 14 can be inserted into the inner space of the endless belt in a non-contact state.

Although in the above-described embodiment, the output disc 27 functions as the driving force output section (exit) of the transmission 15, the present invention is not limited to this. The transmission 15 may have a configuration in which the transmission output shaft 21 functions as the output section (exit).

Although in the above-described embodiment, the electric power generating device 11 is coupled to the high-pressure shaft 6 via the coupling shaft 12 and the gear box 13, the present invention is not limited to this. Alternatively, the electric power generating device 11 may be coupled to the low-pressure shaft 5 via the coupling shaft 12 and the gear box 13.

REFERENCE SIGNS LIST

S through-hole
10 engine for aircraft
11 electric power generating device for aircraft
14 device input shaft
14a first end of device input shaft in axial direction
14b second end of device input shaft in axial direction
15 transmission (traction CVT)
16 electric power generator
17 driving force transmission mechanism
18 casing
18a mounting section
19 auxiliary unit
35 oil feeding pump
36 oil suction pump
37 first gear
38 second gear
39 third gear
40 fourth gear

The invention claimed is:

1. An electric power generating device for an aircraft, which is driven by an output of an aircraft engine, the electric power generating device comprising:
   an input shaft to which a driving force of the engine is transmitted;
   a transmission arranged with the input shaft;
   an electric power generator arranged with the input shaft and the transmission and driven by an output of the transmission;
   a driving force transmission mechanism disposed on a first end side of the input shaft in an axial direction thereof, the driving force transmission mechanism being configured to transmit the output of the transmission to the electric power generator; and
   a casing including a mounting section on the first end side of the input shaft in the axial direction,
   wherein the transmission includes a transmission input section provided on a second end side of the input shaft in the axial direction, the transmission input section being configured to receive as an input a rotational driving force from the input shaft, and a transmission output section provided on the first end side of the input shaft in the axial direction, the transmission output section being configured to output to the driving force transmission mechanism the rotational driving force whose speed has been changed,
   wherein the driving force transmission mechanism has an inner space and the input shaft is inserted into the inner space, and supported by at least one bearing to permit rotation with respect to the transmission and the electric power generator; and wherein the input shaft is disposed between the transmission and the electric power generator.

2. The electric power generating device for the aircraft according to claim 1, wherein the driving force transmission mechanism is a gear mechanism and includes a hollow gear which transmits the rotational driving force of the input shaft toward the electric power generator and has a through-hole, and wherein the inner space is the through-hole of the hollow gear.

3. The electric power generating device for the aircraft according to claim 2, wherein the engine has an outer peripheral portion with a circular-arc shape, wherein the driving force transmission mechanism includes a plurality of gears, wherein the hollow gear is one of the plurality of gears, and wherein the plurality of gears are arranged in an arched shape along a circumferential direction of the outer peripheral portion of the engine.

4. The electric power generating device for the aircraft according to claim 1, further comprising:

at least one auxiliary unit driven by the output of the transmission, wherein the output of the transmission is transmitted from the transmission to the at least one auxiliary unit via the driving force transmission mechanism to drive the at least one auxiliary unit.

5. The electric power generating device for the aircraft according to claim 1, wherein the transmission is a traction continuously variable transmission.

6. The electric power generating device for the aircraft according to claim 1, wherein the driving force transmission mechanism, a coupling portion at which the driving force transmission mechanism and the electric power generator are coupled to each other, and a coupling portion at which the driving force transmission mechanism and the transmission are coupled to each other are located in the vicinity of the mounting section.

* * * * *